United States Patent
Grumstrup et al.

(10) Patent No.: US 6,895,351 B2
(45) Date of Patent: May 17, 2005

(54) REGULATOR FLOW MEASUREMENT APPARATUS

(75) Inventors: Bruce F. Grumstrup, Marshalltown, IA (US); Paul R. Adams, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/373,209

(22) Filed: Feb. 24, 2003

(65) Prior Publication Data

US 2003/0233203 A1 Dec. 18, 2003

Related U.S. Application Data

(63) Continuation-in-part of application No. 09/603,474, filed on Jun. 23, 2000, now Pat. No. 6,539,315.
(60) Provisional application No. 60/141,576, filed on Jun. 29, 1999.

(51) Int. Cl.[7] .............................. G01L 27/00; G01F 1/00; G16K 31/36
(52) U.S. Cl. .............................. 702/98; 702/45; 702/47; 137/487.5
(58) Field of Search .......................... 702/98, 94, 100, 702/45, 47; 137/487.5, 492.5; 700/282

(56) References Cited

U.S. PATENT DOCUMENTS

| | | |
|---|---|---|
| 2,536,000 A | 12/1950 | Bowditch .................... 137/156 |
| 3,633,416 A | 1/1972 | Van Dyke ..................... 73/199 |
| 3,846,774 A | 11/1974 | Thorbard et al. ....... 340/239 R |
| 4,206,902 A | 6/1980 | Barthel et al. ................ 251/57 |
| 4,581,707 A | 4/1986 | Millar ........................ 364/509 |
| 4,799,466 A * | 1/1989 | Shibata et al. .............. 123/327 |
| 5,047,965 A | 9/1991 | Zlokovitz .................... 364/558 |
| 5,197,328 A | 3/1993 | Fitzgerald .................... 73/168 |
| 5,251,148 A | 10/1993 | Haines et al. ............... 364/509 |
| 5,636,653 A | 6/1997 | Titus ........................... 137/14 |
| 5,728,942 A | 3/1998 | Boger ......................... 73/756 |
| 6,035,878 A | 3/2000 | Adams et al. ................. 137/1 |
| 6,056,008 A | 5/2000 | Adams et al. ........... 137/487.5 |
| 6,178,997 B1 | 1/2001 | Adams et al. ........... 137/487.5 |

FOREIGN PATENT DOCUMENTS

| | | |
|---|---|---|
| DE | 40 25 323 | 2/1992 |
| DE | 94 04 829.0 | 6/1994 |
| EP | 660 017 A1 | 12/1994 |
| EP | 708 389 A1 | 4/1996 |
| EP | 1 146 327 A2 | 10/2001 |
| WO | WO 01/01215 A1 | 1/2001 |
| WO | WO 02/071165 A2 | 9/2002 |
| WO | WO 02/088861 A1 | 11/2002 |

OTHER PUBLICATIONS

International Search Report in PCT/US03/41231 dated Jun. 25, 2004.
Tartarini, "Data Logger LOGT 600" Brochure, Sep. 1998.
PCT International Search Report for PCT/US00/17585.

* cited by examiner

*Primary Examiner*—John Barlow
*Assistant Examiner*—Meagan S Walling
(74) *Attorney, Agent, or Firm*—Marshall, Gerstein & Borun LLP

(57) ABSTRACT

A method and an apparatus for determining fluid flow through a pressure regulator is disclosed. The pressure regulator is disposed in a fluid flow passage and has a throttling element moveable in the flow passage. A stem is attached to the throttling element. The apparatus includes a first pressure sensor for measuring pressure upstream of the throttling element, a second pressure sensor for measuring pressure downstream of the throttling element, and a travel sensor for detecting the position of the throttling element. A processor is provided which includes a stored algorithm for determining flow rate based on the measured pressure and travel values and for calibrating the pressure regulator using a temporary flow meter disposed downstream of the throttling element. A system and method is also provided for calibrating a temperature transmitter associated with the pressure regulator.

9 Claims, 5 Drawing Sheets

REGULATOR FLOW MEASUREMENT APPARATUS

CROSS-REFERENCE TO RELATED APPLICATION

This application is a continuation-in-part of U.S. patent application Ser. No. 09/603,474 filed Jun. 23, 2000, now U.S. Pat. No. 6,539,315 that in turn claims the benefit under 35 U.S.C. §119(e) of U.S. provisional patent application Ser. No. 60/141,576 filed Jun. 29, 1999, the disclosure of which is incorporated herein by reference.

FIELD OF THE INVENTION

The present invention generally relates to regulators and, more particularly, to apparatus and methods for measuring operational parameters across a regulator and calculating flow.

BACKGROUND OF THE INVENTION

In the control of fluid in industrial processes, such as oil and gas pipeline systems, chemical processes, etc., it is often necessary to reduce and control the pressure of a fluid. Regulators are typically used for these tasks by providing adjustable flow restriction through the regulator. The purpose of the regulator in a given application may be to control pressure, flow rate, or other process variables, but the restriction inherently induces a pressure reduction as a by-product of its flow control function.

By way of example, a specific application in which regulators are used is the distribution and transmission of natural gas. A natural gas distribution system typically includes a piping network extending from a natural gas field to one or more consumers. In order to transfer large volumes of gas, the gas is compressed to an elevated pressure. As the gas nears the distribution grid and, ultimately, the consumers, the pressure of the gas is reduced at pressure reducing stations. The pressure reducing stations often use regulators to reduce gas pressure.

Some of such pressure reducing stations may be located at or near a custody transfer point in the distribution system. For example, pressure reducing stations that use regulators to reduce gas pressure may be located at a location of a consumer, such as a residential, commercial, or industrial end user.

Accuracy of flow measurement may be important at such custody transfer points, and flow measurement is typically carried out by the use of one or more flow meters. However, flow meters can be expensive to build, install, and maintain, and other means for providing accurate flow measurement without the added expense of flow meters would be beneficial. Flow measurement problems similar to those described above with respect to natural gas distribution are also present in other regulator applications (i.e., industrial processes, chemical processes, etc., including applications that involve steam and other types of liquids and/or gases).

SUMMARY OF THE INVENTION

An apparatus for calibrating a pressure regulator disposed in a fluid flow passage is provided. The pressure regulator includes a throttling element moveable in the flow passage. The apparatus includes a first pressure sensor in fluid communication upstream of the throttling element for measuring an upstream pressure, a second pressure sensor in fluid communication downstream of the throttling element for measuring a downstream pressure, a travel sensor for determining a throttling element position, a flow meter disposed downstream of the throttling element, a processor associated with the first pressure sensor, second pressure sensor, travel sensor, and flow meter. The processor has a stored program for determining a stem position coefficient correction.

A method of calibrating a pressure regulator disposed in a fluid flow passage is also provided. The pressure regulator includes a throttling element moveable in the flow passage, and a temporary flow meter disposed downstream of the throttling element. The method includes the steps of generating an upstream pressure value $P_1$ by measuring fluid pressure upstream of the throttling element, generating a downstream pressure value $P_2$ by measuring fluid pressure downstream of the throttling element, generating a travel value Y by determining a position of the throttling element, calculating a fluid flow value $F_c$ based on the upstream pressure value $P_1$, downstream pressure value $P_2$, and travel value Y, reading a measured fluid flow valve $F_m$ from the flow meter, and generating a valve sizing correction based on the travel value Y.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, and in which:

DETAILED DESCRIPTION OF THE PREFERRED EMBODIMENTS

Figure 1:
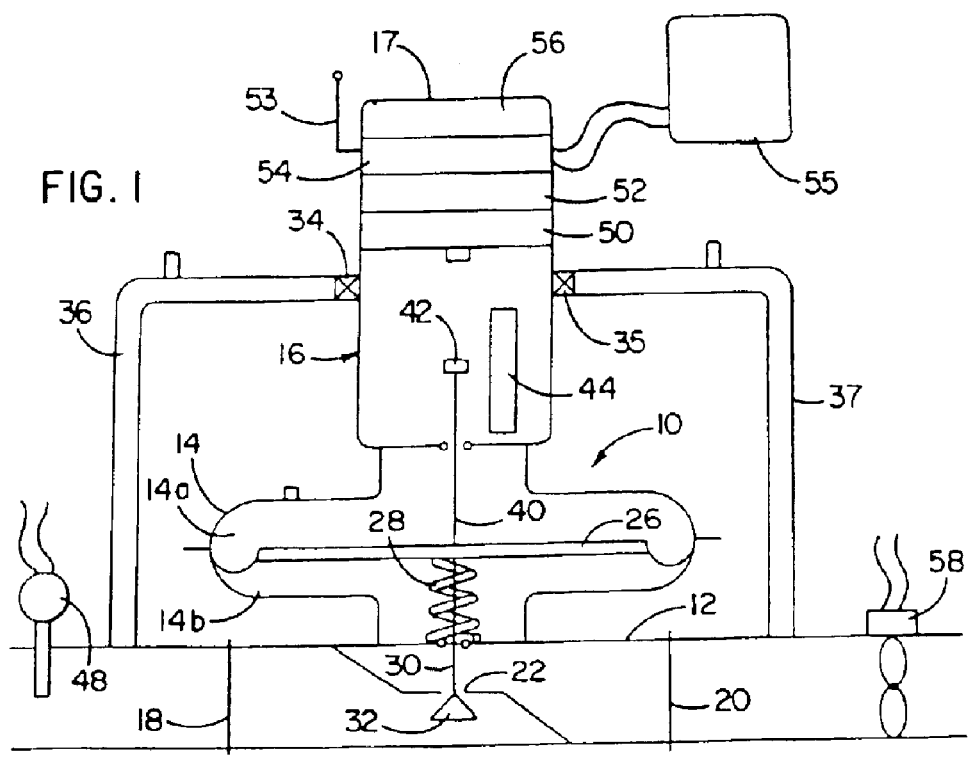
FIG. 1 is a schematic diagram illustrating a regulator with flow measuring apparatus in accordance with the present invention.

FIG. 1 illustrates a preferred embodiment of a fluid pressure regulator, such as a gas pressure regulator 10, in accordance with the invention. The illustrated gas pressure regulator 10 includes gas flow measuring apparatus as will be described hereinafter wherein upstream pressure, downstream pressure, and orifice opening measurements are used to calculate flow and other information. It is to be understood that a liquid or steam pressure regulator also may be provided in accordance with the principles of the invention, as the illustrated gas pressure regulator is merely one example of a fluid pressure regulator according to the invention.

The regulator shown in FIG. 1 includes a regulator body 12, a diaphragm housing 14, and an upper housing 16. Within the regulator body 12, there is provided an inlet 18 for connection to an upstream pipeline and an outlet 20 for connection to a downstream pipeline. An orifice 22 inside the regulator body 12 establishes communication between the inlet 18 and the outlet 20.

A diaphragm 26 is mounted inside the diaphragm housing 14 and divides the diaphragm housing 14 into upper and lower portions 14a, 14b. A pressure spring 28 may be attached to a center of the diaphragm 26 and may be disposed in the lower portion of the diaphragm housing 14b to bias the diaphragm 26 in an upward direction.

A stem 30 may be attached to and moves with the diaphragm 26. A throttling element, such as a valve disc 32, may be attached to a bottom end of the stem 30 and disposed below the orifice 22. The valve disc 32 may be positioned to completely block the orifice 22, thereby cutting off communication from the inlet 18 to the outlet 20. Accordingly, it will be appreciated that the pressure spring 28 may bias the valve disc 32 in an upward direction to close the orifice 22 (i.e., a "fail closed" arrangement) or, alternatively, the pressure spring 28 may be configured to bias the valve disc 32 in a downward direction to open the orifice 22 (i.e., a "fail open" arrangement). The valve disc 32 may be formed with a varying cross-section so that, as the valve disc 32 moves downwardly, the unblocked (or open) area of the orifice 22 gradually increases. As a result, the open area of the orifice 22 is directly related to the position of the valve disc 32.

Gas pressure in the upper portion 14a of the diaphragm housing 14 may be controlled to move the valve disc 32 between the closed and open positions. Pressure in the upper portion 14a may be provided in a number of different manners. In the present embodiment, pressure in the upper portion 14a is controlled by a loading pilot (not shown). However, the regulator 10 may be of a type which uses a different type of operator, such as an unloading pilot, or the regulator 10 may be self-operated or pressure-loaded, or may be a direct operated regulator, without departing from the scope of the present invention.

A further alternative for controlling the gas pressure in the upper portion 14a of the diaphragm housing 14 includes a first tube running from the upstream piping to the upper portion 14a of the diaphragm housing 14, with a first solenoid controlling gas flow therethrough. A second tube may also be provided which runs from the upper portion 14a of the diaphragm housing 14 to the downstream piping and has a second solenoid disposed therein to control flow therethrough. A personal computer may be connected to the first and second solenoids to control their operation. To increase pressure in the upper portion 14a of the diaphragm housing 14, the first solenoid may be opened to allow upstream pressure into the upper portion, thereby driving the diaphragm 26 downward to open the orifice 22. Gas may be exhausted through the second solenoid to thereby reduce pressure in the upper portion 14a and raise the diaphragm 26, thereby closing the orifice 22. Regardless of the manner of providing and controlling pressure, it will be appreciated that increased pressure moves the diaphragm 26 and attached valve disc 32 downward to open the orifice 22 while decreased pressure closes the orifice 22. This arrangement is given by way of example only, and is not intended to limit the scope of the present invention, as other arrangements well known in the art may also be used, such as, for example, direct operated regulators.

In accordance with certain aspects of the present invention, pressure sensors may be provided upstream and downstream of the throttling element to measure upstream and downstream pressure levels $P_1$, $P_2$. As illustrated in FIG. 1, the first and second pressure sensors 34, 35 may be mounted to the upper housing 16. Tubing 36 may extend from the first pressure sensor 34 to tap into piping located upstream of the regulator inlet 18. Additional tubing 37 may extend from the second pressure sensor 35 to tap into piping located downstream of the regulator outlet 20. Accordingly, while the first and second pressure sensors 34, 35 may be mounted on the upper housing 16, the tubing 36, 37 communicates upstream and downstream gas pressure, respectively, to the first and second pressure sensors 34, 35. In the alternative, the first and second pressure sensors 34, 35 may be located directly in the upstream and downstream piping with wiring running from the pressure sensors to the upper housing 16. To provide for temperature correction, if desired, a process fluid temperature transmitter 48 is located in the upstream piping which measures process temperature.

The upper housing 16 further includes a sensor for determining valve disc position. According to the illustrated embodiment, the stem 30 is attached to the valve disc 32 and is connected to the diaphragm 26. A travel sensor 40, which is preferably an extension of the stem 30, may extend from the diaphragm and into the upper housing 16, so that the position of the travel sensor 40 corresponds to the position of the valve disc 32. The sensor, therefore, may comprise an electromagnetic travel sensing mechanism, preferably a Hall Effect sensor. The Hall Effect sensor includes a Hall Effect magnet 42 that may be attached to an upper end of the travel sensor 40. A magnet sensor 44 may be disposed inside the upper housing 16 for sensing the location of the Hall Effect magnet 42. By detecting the position of the magnet 42, the location of the valve disc 32 and hence the open area of the orifice 22 may be determined. A second travel sensor (not shown) may be linked to the travel sensor 40 to provide visual indication of valve disc travel. The second travel sensor may run upwardly from the travel sensor 40 and through the upper housing 16 to extend above a top surface of the upper housing 16.

An alternative for measuring travel of the valve disc 32 is the use of a radar transceiver (not shown) that may be disposed above the travel sensor 40 in the upper housing 16. The radar transceiver detects the position of the travel sensor 40 and transmits a signal indicating valve disc position.

It will be appreciated that the position of the valve disc 32 may be determined in a number of different manners in addition to the magnet 42 and sensor 44 embodiment described above. For example, a laser sensor (not shown) may be provided either in the upper housing 16 to measure the position of the travel sensor 40, or in the diaphragm housing 14 for directly measuring the position of a portion of the diaphragm 26. When the laser sensor is in the latter position, the travel sensor 40 is not needed. In addition, an ultrasonic sensor may be used to determine valve disc position.

Figure 2:
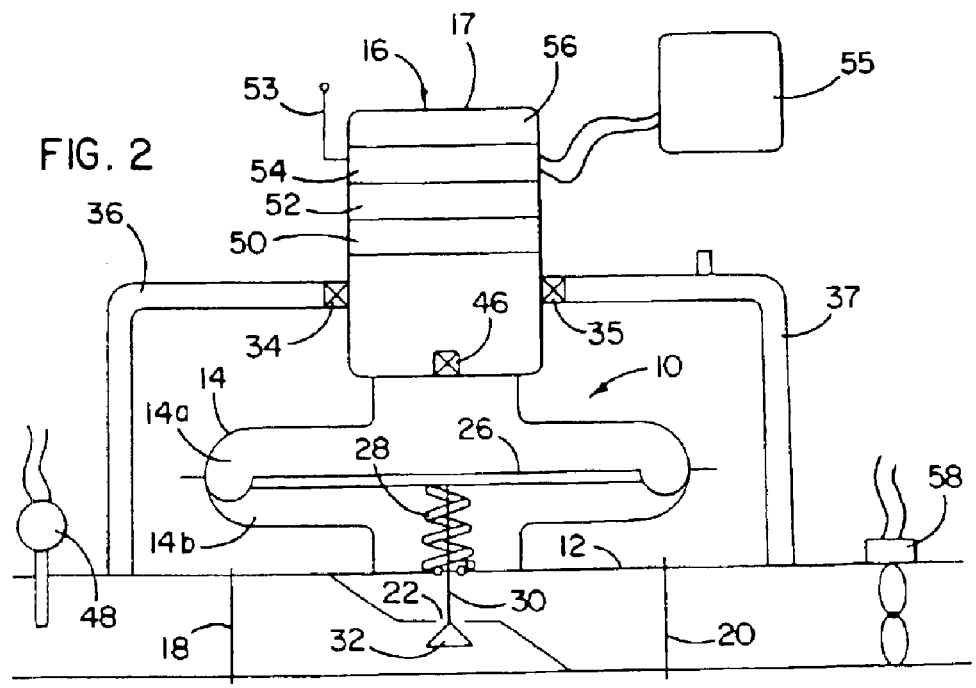
FIG. 2 is a schematic diagram of an additional embodiment of a regulator incorporating flow measuring apparatus.

A further alternative, illustrated at FIG. 2, measures loading pressure in the upper portion of the diaphragm housing 14a to infer valve disc position. It will be appreciated that the position of the valve disc 32 varies with the pressure present in the upper portion 14a of the diaphragm housing. In this embodiment, a loading pressure sensor 46 is provided in the upper housing 16 for measuring pressure at the upper portion of the diaphragm housing 14a. The measured loading pressure may then be used to determine valve disc position.

Returning to the embodiment of FIG. 1, the first and second pressure sensors 34, 35 and the travel sensor 44 provide output which is fed into an electronic flow module 50. The electronic flow module 50 may be provided integrally with the regulator, such as in the upper housing 16 as illustrated in FIG. 1, or may be remotely positioned. The inlet pressure, outlet pressure, and valve disc position are used to determine flow through the variable orifice of the regulator 10. For sub-critical gas flow, the flow rate is calculated using the algorithm:

$$F = \sqrt{\frac{K_1}{G*T}} * K_2 * Y * P_1 * \sin K_3 \sqrt{\frac{P_1 - P_2}{P_1}},$$

where
F=flow rate,
$K_1$=absolute temperature constant,
G=specific gravity of the flow media,
T=absolute temperature of the flow media,
$K_2$=stem position coefficient,
Y=stem position,
$P_1$=absolute upstream pressure,
$K_3$=trim shape coefficient, and
$P_2$=absolute downstream pressure.

The stem position and trim shape coefficients $K_2$, $K_3$ are specific to the particular size and type of regulator, and are primarily dependent on the specific trim size and shape. As those skilled in the art will appreciate, the product of $K_2$ and Y may be equivalent to a traditional flow sizing coefficient. The above algorithm is suitable for calculating sub-critical (i.e., $P_1-P_2<0.5P_1$) gas flow rate through linear, metal trim valve type regulators.

For critical gas flows, the calculation is modified by eliminating the sine function. For other types of regulators, such as non-linear metal trim and elastomeric style regulators, a similar algorithm is used, however the stem position coefficient $K_2$ becomes a function related to pressure drop ΔP (i.e., the difference in upstream and downstream pressures $P_1$, $P_2$) and/or valve stem position, as is well known in the art. For liquid flow, the equation becomes:

$$F = \sqrt{\frac{K_1}{G*T}} * K_2 * Y * \sqrt{P_1 - P_2},$$

where
F=flow rate,
$K_1$=absolute temperature constant,
G=specific gravity of the flow media,
T=absolute temperature of the flow media,
$K_2$=stem position coefficient,
Y=stem position,
$P_1$=absolute upstream pressure, and
$P_2$=absolute downstream pressure.

A similar calculation is used in the embodiment of FIG. 2, which measures loading pressure in the upper portion of the diaphragm housing 14a to infer valve disc travel, except a loading pressure constant $K_4$ and a gauge loading pressure $P_L$ replace the stem position coefficient $K_2$ and the stem position Y values. The loading pressure constant $K_4$ is also application specific and must be determined for each type of regulator 10. For non-linear elastomeric throttling members, the loading pressure constant $K_4$ is a function of ΔP and $P_L$. One skilled in the art will of course recognize that other calculations may be used to calculate flow characteristics for steam, liquids, and/or gases.

In the preferred embodiment, a local flow view module 52 may also be disposed inside the upper housing 16. The local flow view module 52 may include an electronic flow totalizer which provides totalized flow information. The local flow view module 52 further may have an output port which allows access by a hand-held communication device to access the totalized flow and reset the local flow totalizer for future use. In the currently preferred embodiment, the local flow view module 52 includes an LCD readout enclosed inside the upper housing 16. A cap 17 attached to the top of the upper housing 16 may have a clear plastic window which allows the LCD readout to be viewed.

A communication module 54 transmits flow data to an auxiliary communication device 55, such as a remote terminal unit (RTU), a personal computer, or any other device capable of interrogating the regulator controls. The communication module 54 may include an antenna 53 for transmitting flow information to a remote meter reading system (not shown). A power module 56 may also be provided for powering the flow measurement mechanism. The power module 56 may be capable of providing regulated voltage for the entire device, and may be supplied by any well known source such as solar, battery, and DC or AC power sources.

It will be appreciated that the electronic flow module 50, local flow view module 52, communication module 54, and power module 56 may be separately provided as illustrated in FIG. 1, or may be provided on a single main circuit board located inside the upper housing 16.

The calculated flow rate through the regulator 10 may be quickly and easily calibrated using a separate flow meter 58. The flow meter 58, which may be a turbine or other type of meter, is temporarily inserted into the downstream pipeline to measure actual fluid flow. The flow meter 58 may provide feedback to the auxiliary communication device 55 (RTU, personal computer, etc.) or directly to the main circuit board. The feedback may be used to generate an error function based on observed flow conditions which is then incorporated into the flow calculations performed by the regulator 10, thereby to provide more accurate flow data.

Figure 3:
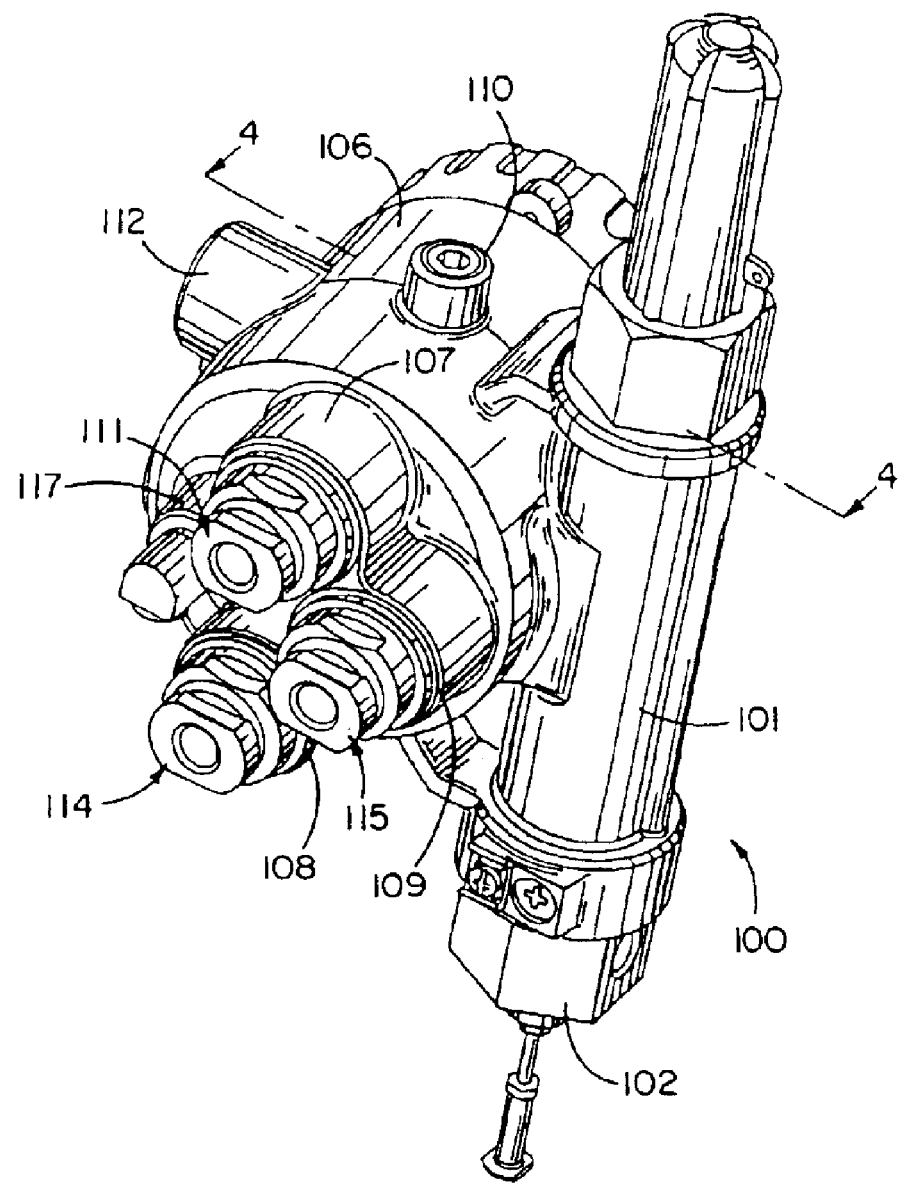
FIG. 3 is a perspective view of the regulator flow measurement apparatus.
Figure 4:
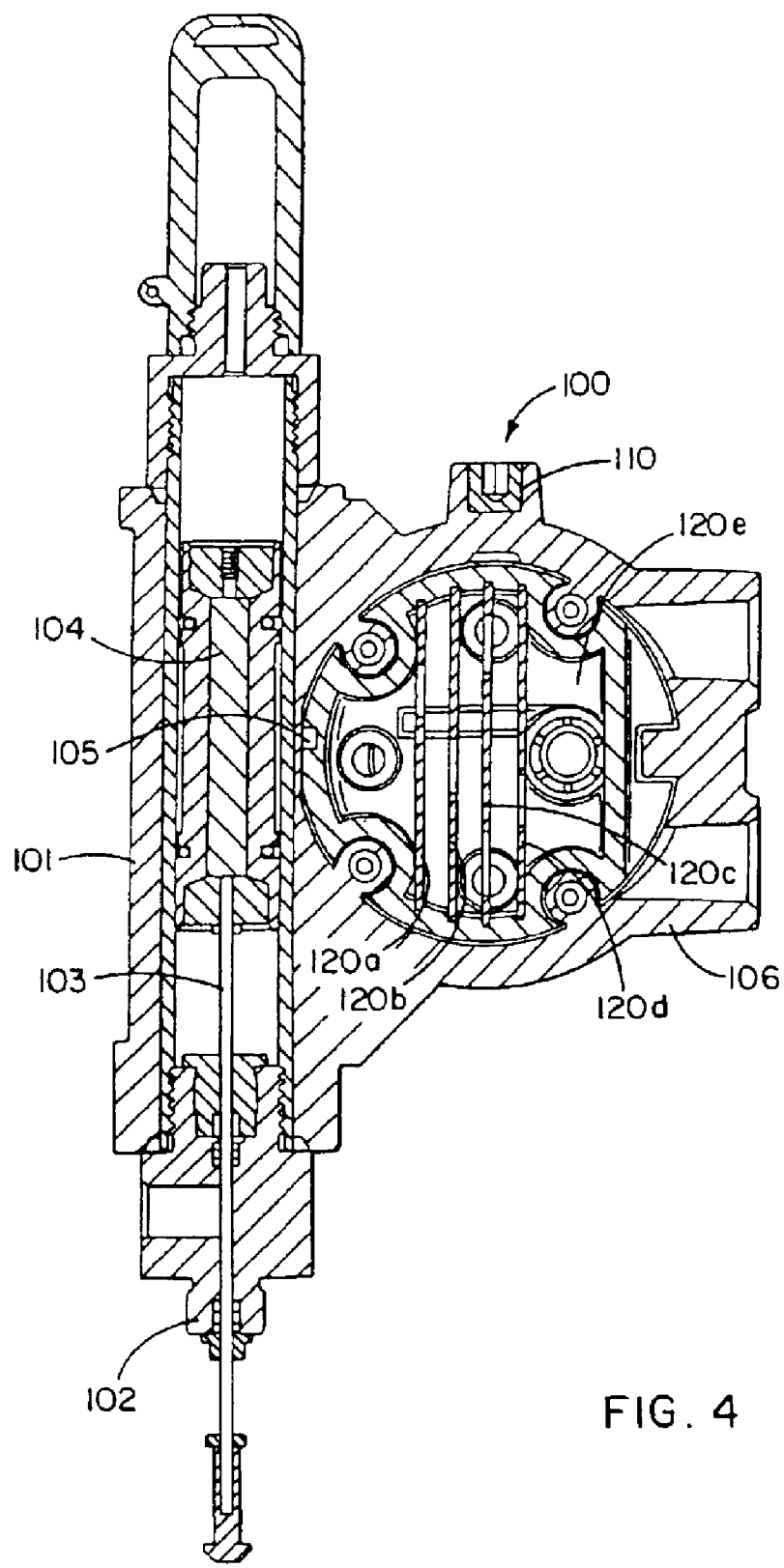
FIG. 4 is a side elevation view, in cross-section, of regulator flow measurement apparatus in accordance with the teachings of the present invention.

A currently preferred embodiment of regulator flow measurement and diagnostic apparatus is illustrated in FIG. 3, generally designated by reference numeral 100. As shown in FIG. 3, the apparatus 100 includes a cylindrical body 101 having a first end 102 adapted for connection to a regulator (not shown). As with the previous embodiments, the regulator is disposed in a fluid flow passage having an upstream section and a downstream section. The cylindrical body 101 encloses a travel indicator 103 (FIG. 4) which is connected to a diaphragm (not shown) in the regulator. According to the illustrated embodiment, a Hall Effect sensor may be used to detect the position of the travel indicator 103. A portion 104 of the travel indicator 103 may be formed of magnetic material having pole pieces. A hall element 105 (FIG. 4) may be positioned to detect the magnetic material portion 104 and generate a position signal according to the position of the travel indicator 103.

A housing 106 may be attached to the cylindrical body 102 and may have a first pressure port 107, a second pressure port 108, an auxiliary pressure port 109, and an auxiliary port 110 (FIG. 3). A first pressure sensor assembly 111 may be inserted inside the first pressure port 107, and a tube (not shown) may connect the assembly 111 to the upstream section of the flow passage. A second pressure sensor assembly 114 may be inserted into the second pressure port 108, and a tube (not shown) may connect the second assembly 114 to the downstream section of the flow passage. A third pressure sensor assembly 115 may be inserted into the auxiliary pressure port 109 for measuring at a third pressure point. The third pressure sensor 115 may be used to measure pressure at a variety of locations, including in the flow passage or in the regulator to infer plug travel, as described in greater detail above with regard to the previous embodiment. In a preferred embodiment, a fourth pressure port 117 may be provided for measuring atmospheric pressure. The auxiliary port 110 is provided for receiving discrete or analog input from another device, such as the temperature transmitter 48 illustrated in FIG. 1. In addition, an I/O port 112 is provided for connection to an outside device, as described in greater detail below.

A plurality of circuit boards 120a–e may be disposed inside the housing 105 for controlling various operations of the apparatus 100. In the illustrated embodiment, a first (or main) circuit board 120a may include an interface for the first, second, third pressure sensors, and atmospheric pressure sensors, and a connection for the hall effect sensor 105. A second (or communication) circuit board 120b may provide an interface for communication with outside devices. The second circuit board 120b may include connection for wired transmission, such as a modem card, an RF232 communication driver, and a CDPD modem. In addition or alternatively, a transceiver may be provided for wireless communication. A third (or main) circuit board 120c preferably includes a processor, a memory, a real-time clock, and communication drivers for two communication channels. The processor may include, among other things, one or more of the algorithms noted above for calculating flow rate, while the memory may store selected parameters, such as the high and low pressures for each day. An optional fourth circuit board 120d may provide an interface for the auxiliary communication device 55. A fifth (or termination) board 120e may also be provided having a power supply regulator, field termination (for connection to I/O devices), a back-up power supply, and connections into which the other boards 120a–d may plug into. While five circuit boards 120a–e are shown in the illustrated embodiment, it will be appreciated that a single circuit board, less than five circuit boards, or more than five circuit boards may be used without departing from the scope of the invention.

It will be appreciated, therefore, that communication between the apparatus 100 and an outside device may be by RF modem, Ethernet or any other suitable communication link. The processor allows the outside devices to enter information such as desired pressure set points and alarm conditions into the apparatus 100, and retrieve data stored in the memory. The data retrieved may include the alarm log and stored operational parameters. For instance, the retrieved information may include a history of upstream and downstream pressures stored periodically in memory, so that the apparatus 100 provides the function of a pressure recorder.

As noted above, the calculated flow rate through the regulator 10 may be quickly and easily calibrated using the separate flow meter 58. For example, a $K_2$ correction table may be generated using the procedure illustrated in the flow chart of FIG. 5, where $K_2$ is the stem position coefficient.

Figure 5:
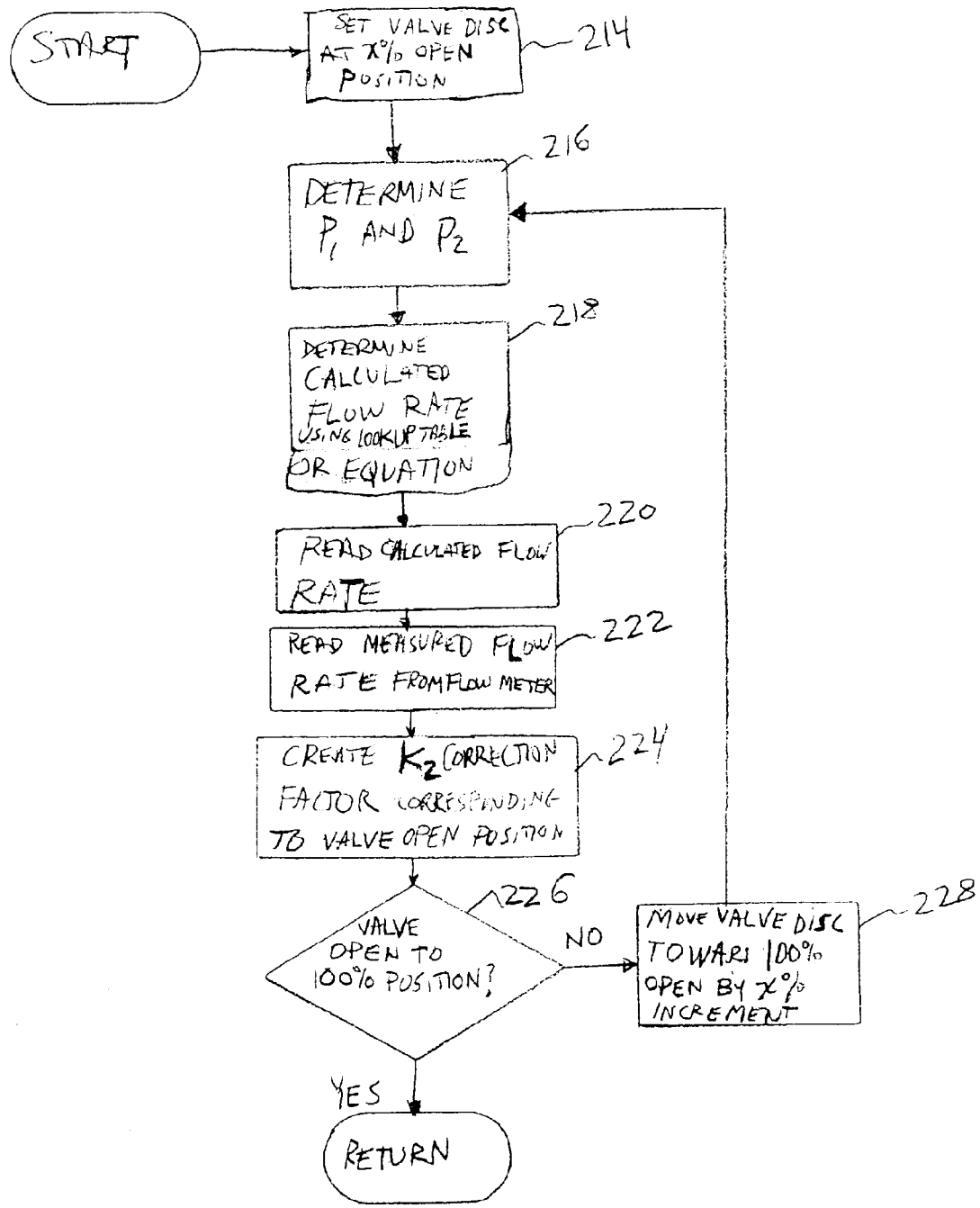
FIG. 5 is a flow chart schematically illustrating a calibration system and method.

With reference to FIG. 5, at block 214, the valve disc 32 may be placed in a 1% open position, using the diaphragm 26 to move the valve disc 32 (FIGS. 1 and 2), the Hall effect magnet 42 and the magnet sensor 44 (FIG. 1) or the loading pressure sensor 46 (FIG. 2) to precisely position the valve disc 32.

The auxiliary communication device 55 may then determine the upstream and downstream pressure levels $P_1$, $P_2$ provided by the first and second pressure sensors 34, 35, respectively, as indicated at block 216. Next, as indicated at block 218, a calculated flow rate may be determined. The calculated flow rate may be determined by accessing a $K_2$ versus valve disc travel algorithm (for example, a lookup table or equation stored in memory providing an output of $K_2$ when an input of valve disc travel is provided).

Next, a flow corrector (that my reside in the auxiliary communication device 55 in the form of software, hardware, firmware, or any combination thereof) reads the calculated flow rate (at block 220), reads the flow rate measured by the flow meter 58 (at block 222), and creates a $K_2$ correction factor corresponding to the position of the valve disc 32 (at block 224). If it is determined that the valve disc 32 is not at the fully open (100%) position (at block 226), then the valve disc 32 is moved toward the fully open position by another 1% increment at block 228. Next, the, procedures of blocks 216 through 226 are repeated for successive valve disc travel increments (e.g., 2% through 100%, in increments of 1%) and a lookup table of $K_2$ correction factors versus valve disc travel increments may be created (or, if desired a suitable curve fit algorithm may be used to determine an equation for determining the $K_2$ correction factor as a function of valve disc travel). Of course a smaller valve disc position increment than 1% may be used if greater precision is desired, and a larger valve disc position increment may be used if less precision is needed.

Figure 6:
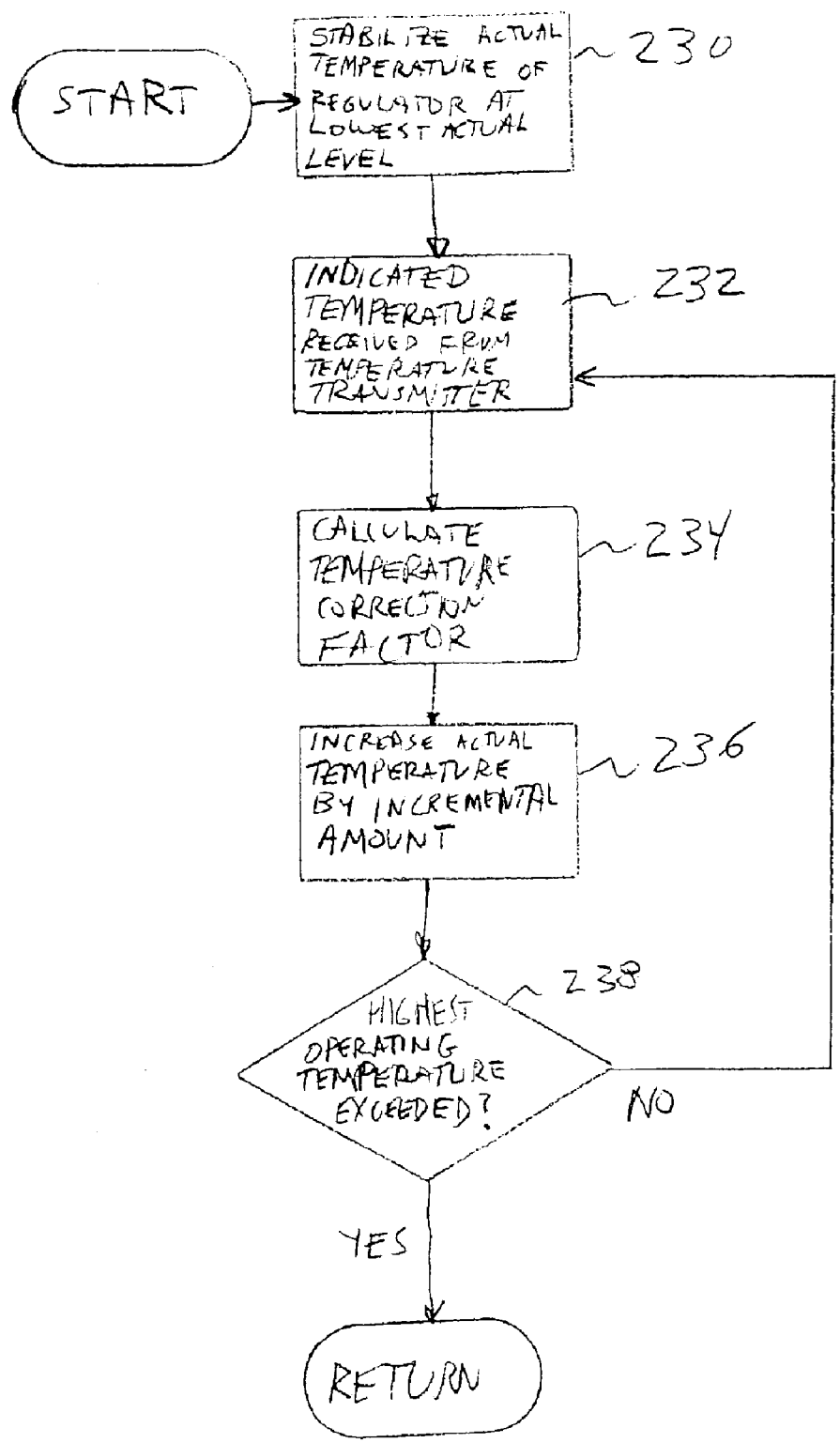
FIG. 6 is a flow chart schematically illustrating a temperature measurement calibration system and method.

In addition, in order to obtain even more precise flow rate data, a calibration of the temperature transmitter 48 may be performed, as depicted in FIG. 6. With reference to FIG. 6, at block 230 the temperature of the gas pressure regulator 10 is stabilized at a lowest actual operating temperature. Next, at block 232, an indicated temperature is provided by the temperature transmitter 48. A temperature correction factor is calculated at block 234, e.g., by dividing the actual operating (absolute) temperature by the indicated (absolute) temperature. Next, at block 236, the temperature of the gas pressure regulator 10 is stabilized at an incrementally higher operating temperature (the increment may be, for example, 1 degree K, or a higher or lower increment, as desired), a decision block 238 is used to determine whether the highest operating temperature has been exceeded. The steps of block 230 through 238 are then repeated. A lookup table of temperature correction factors versus indicated temperatures may thus be created.

The foregoing detailed description has been given for clearness of understanding only, and no unnecessary limitations should be understood therefrom, as modifications will be obvious to those skilled in the art.

What is claimed is:

1. Apparatus for calibrating a pressure regulator disposed in a fluid flow passage, the pressure regulator having a throttling element moveable in the flow passage, the apparatus comprising:

a first pressure sensor in fluid communication upstream of the throttling element for measuring an upstream pressure;

a second pressure sensor in fluid communication downstream of the throttling element for measuring a downstream pressure;

a travel sensor for determining a throttling element position;

a flow meter disposed downstream of the throttling element for reading a measured fluid flow value;

a processor associated with the first pressure sensor, second pressure sensor, travel sensor, and flow meter, the processor having a stored program for determining a stem position coefficient correction based on the upstream pressure, the downstream pressure, the throttling element position, a calculated fluid flow value, and the measured fluid flow value.

2. The apparatus of claim 1, wherein the stem position coefficient correction includes a calculation of a plurality of stem position coefficient correction factors for a plurality of throttling element positions.

3. The apparatus of claim 2, wherein the stem position coefficient correction factors are stored in a lookup table.

4. The apparatus of claim 1, further including a temperature transmitter, wherein the processor includes a stored program for calibrating the temperature transmitter.

5. The apparatus of claim 1, wherein the flow meter is temporarily installed downstream of the throttling element.

6. A method of calibrating a pressure regulator disposed in a fluid flow passage, the pressure regulator having a throttling element moveable in the flow passage, and a temporary flow meter disposed downstream of the throttling element, the method comprising the steps of:

generating an upstream pressure value $P_1$ by measuring fluid pressure upstream of the throttling element;

generating a downstream pressure value $P_2$ by measuring fluid pressure downstream of the throttling element;

generating a travel value Y by determining a position of the throttling element;

calculating a calculated fluid flow value $F_c$ based on the upstream pressure value $P_1$, downstream pressure value $P_2$, and travel value Y;

reading a measured fluid flow value $F_m$ from the flow meter; and generating a stem position coefficient correction based on the travel value Y, the calculated fluid flow value $F_c$, and the measured fluid flow value $F_m$.

7. The method of claim 6, further including the steps of:

stabilizing the fluid temperature within the pressure regulator;

reading an indicated fluid temperature; and calculating a temperature correction factor.

8. Apparatus for calibrating a pressure regulator disposed in a fluid flow passage, the pressure regulator having a throttling element moveable in the flow passage, the apparatus comprising:

a first pressure sensor in fluid communication upstream of the throttling element for measuring an upstream pressure;

a second pressure sensor in fluid communication downstream of the throttling element for measuring a downstream pressure;

a travel sensor for determining a throttling element position;

a flow meter disposed downstream of the throttling element for reading a measured fluid flow value;

a processor associated with the first pressure sensor, second pressure sensor, travel sensor, and flow meter, the processor having a stored program for determining a stem position coefficient correction based on the upstream pressure, the downstream pressure, the throttling element position, and the measured fluid flow value; wherein the stem position coefficient correction includes a calculation of a plurality of stem position coefficient correction factors for a plurality of throttling element positions.

9. Apparatus for calibrating a pressure regulator disposed in a fluid flow passage, the pressure regulator having a throttling element moveable in the flow passage, the apparatus comprising:

a first pressure sensor in fluid communication upstream of the throttling element for measuring an upstream pressure;

a second pressure sensor in fluid communication downstream of the throttling element for measuring a downstream pressure;

a travel sensor for determining a throttling element position;

a flow meter temporarily installed downstream of the throttling element for reading a measured fluid flow value;

a processor associated with the first pressure sensor, second pressure sensor, travel sensor, and flow meter, the processor having a stored program for determining a stem position coefficient correction based on the upstream pressure, the downstream pressure, the throttling element position, and the measured fluid flow value.

* * * * *